United States Patent
Bergström et al.

(10) Patent No.: US 9,559,822 B2
(45) Date of Patent: Jan. 31, 2017

(54) METHOD AND MOBILE NODE FOR DETERMINING A POINT IN TIME FOR TRANSMISSIONS

(71) Applicant: TELEFONAKTIEBOLAGET L M ERICSSON, Stockholm (SE)

(72) Inventors: Mattias Bergström, Stockholm (SE); Robert Baldemair, Solna (SE); Mikael Wittberg, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 169 days.

(21) Appl. No.: 14/347,147

(22) PCT Filed: Oct. 1, 2012

(86) PCT No.: PCT/SE2012/051045
§ 371 (c)(1),
(2) Date: Mar. 25, 2014

(87) PCT Pub. No.: WO2013/048332
PCT Pub. Date: Apr. 4, 2013

(65) Prior Publication Data
US 2014/0233542 A1  Aug. 21, 2014

Related U.S. Application Data

(60) Provisional application No. 61/541,133, filed on Sep. 30, 2011, provisional application No. 61/545,796, filed on Oct. 11, 2011.

(51) Int. Cl.
*H04J 3/06* (2006.01)
*H04W 4/00* (2009.01)
(Continued)

(52) U.S. Cl.
CPC ............. *H04L 5/005* (2013.01); *H04L 5/0085* (2013.01); *H04W 56/001* (2013.01);
(Continued)

(58) Field of Classification Search
CPC .... H04W 56/00; H04W 74/833; H04W 80/04; H04W 88/01; H04L 27/2602
(Continued)

(56) References Cited

U.S. PATENT DOCUMENTS

2002/0049057 A1* 4/2002 Moulsley .............. H04W 52/40
455/436
2004/0128095 A1 7/2004 Oestreich
(Continued)

FOREIGN PATENT DOCUMENTS

CN    102118801 A    7/2011
EP    2217029 A1    8/2010

OTHER PUBLICATIONS

3GPP TS 36.211 V10.3.0 (Sep. 2011); Technical Specification; 3rd Generation Partnership Project; Technical Specification Group Radio Access Network; Evolved Universal Terrestrial Radio Access (E-UTRA); Physical Channels and Modulation (Release 10), Sep. 2011.
(Continued)

*Primary Examiner* — Alpus H Hsu
*Assistant Examiner* — Camquyen Thai
(74) *Attorney, Agent, or Firm* — Patent Portfolio Builders, PLLC

(57) ABSTRACT

Embodiments relate to a method and mobile node in a wireless communication system for determining when to transmit a signal. The mobile node operates in the wireless communication system comprising a first cell and a second cell where the mobile node is synchronized to the first cell. The method comprises determining a timing reference based
(Continued)

on a reception of a downlink transmission in the first cell. The method further comprises transmitting the signal, to be received in the second cell, at a point in time based on the timing reference and a timing advance value of the first cell.

20 Claims, 10 Drawing Sheets

(51) Int. Cl.
H04L 5/00 (2006.01)
H04W 56/00 (2009.01)
H04W 74/08 (2009.01)
H04L 27/26 (2006.01)

(52) U.S. Cl.
CPC ... *H04W 56/0045* (2013.01); *H04W 74/0833* (2013.01); *H04L 27/2602* (2013.01)

(58) Field of Classification Search
USPC ....... 370/252, 280, 328, 329, 335, 336, 350; 455/436, 437, 442, 502, 422.1
See application file for complete search history.

(56) References Cited

U.S. PATENT DOCUMENTS

| | | | |
|---|---|---|---|
| 2005/0025095 A1* | 2/2005 | Kim | H04W 16/26 370/329 |
| 2007/0149206 A1* | 6/2007 | Wang | H04W 36/0077 455/450 |
| 2008/0008156 A1* | 1/2008 | Kuehner | H04B 7/2687 370/350 |
| 2009/0046571 A1* | 2/2009 | Safar | H04L 27/2626 370/210 |
| 2009/0318175 A1* | 12/2009 | Sandberg | H04W 56/0045 455/502 |
| 2011/0007719 A1* | 1/2011 | Lee | H04J 3/0682 370/336 |
| 2012/0014371 A1* | 1/2012 | Weng | H04J 3/0682 370/350 |
| 2012/0127964 A1* | 5/2012 | Turtinen | H04W 56/0045 370/336 |
| 2012/0257601 A1* | 10/2012 | Kim | H04L 5/001 370/336 |
| 2012/0269178 A1* | 10/2012 | Li | H04W 76/02 370/336 |
| 2012/0281678 A1* | 11/2012 | Chin | H04W 56/0045 370/335 |
| 2012/0294163 A1* | 11/2012 | Turtinen | H04W 72/042 370/252 |

OTHER PUBLICATIONS

3GPP TSG RAN WG1 Meeting #62bis; Xi'an, China, Oct. 11-15, 2010; Title: Clarification on the endorsed CR for TS 36.213; R1-105510, Oct. 2010.

* cited by examiner

US 9,559,822 B2

METHOD AND MOBILE NODE FOR DETERMINING A POINT IN TIME FOR TRANSMISSIONS

PRIORITY

This nonprovisional application is a U.S. National Stage Filing under 35 U.S.C. §371 of International Patent Application Serial No. PCT/SE2012/051045, filed Oct. 1, 2012 and entitled "Determining A Point In Time For Transmissions," which claims the benefit of U.S. Provisional Application No. 61/541,133, filed Sep. 20, 2011 and entitled "Methods and Mobile Node," and U.S. Provisional Application No. 61/545,796, filed Oct. 11, 2011 and entitled "Methods and Mobile Node".

TECHNICAL FIELD

Implementations described herein relate generally to a method in a mobile node and a mobile node. In particular is herein described how to determine signal or random access preamble transmission timing in the uplink.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks. The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node, i.e. within the cell served by the network node. It is to be noted that the expression (serving) cell sometimes is utilised when referring to the carrier serving the user equipment, which may be the case also in this disclosure. Also the term component carrier is used interchangeable for cell in this context. Among the serving cells of a terminal operating with carrier aggregation there is always a primary cell or component carrier—PCell—and one or multiple secondary cells or component carriers—SCell.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, may be referred to as eNodeBs or even eNBs. They may in turn be connected to one or more core networks, possibly via a gateway e.g. a radio access gateway. The 3GPP is responsible for the standardization of LTE, and is continuously developing and updating new releases of LTE, such as e.g. LTE Rel. 8 and LTE Rel. 10.

LTE is a technology for realizing high-speed packet-based communication that may reach high data rates both in the downlink and in the uplink, and is thought of as a next generation mobile communication system relative to UMTS.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

LTE uses Orthogonal Frequency-Division Multiplexing (OFDM) in the downlink and Discrete Fourier Transform (DFT)-spread OFDM in the uplink. The basic LTE downlink physical resource may thus be seen as a time-frequency grid as illustrated in FIG. 1A, where each resource element corresponds to one OFDM subcarrier during one OFDM symbol interval.

In the time domain, LTE downlink transmissions are organised into radio frames of 10 ms, each radio frame comprising ten equally-sized subframes of 1 ms, which is illustrated in FIG. 1B.

Furthermore, the resource allocation in LTE is typically described in terms of Resource Blocks (RB), where a resource block corresponds to one slot (0.5 ms) in the time domain and 12 subcarriers in the frequency domain. A pair of two adjacent resource blocks in time direction (1.0 ms) is known as a resource block pair. Resource blocks are numbered in the frequency domain, starting with 0 from one end of the system bandwidth.

The LTE Rel-10 specifications have recently been standardized, supporting Component Carrier (CC) bandwidths up to 20 MHz (which is the maximal LTE Rel-8 carrier bandwidth). Hence, an LTE Rel-10 operation wider than 20 MHz is possible and appear as a number of LTE carriers to an LTE Rel-10 terminal.

In particular for early LTE Rel-10 deployments it may be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals may be scheduled in all parts of the wideband LTE Rel-10 carrier. The straightforward way to obtain this would be by means of Carrier Aggregation (CA). CA implies that an LTE Rel-10 terminal may receive multiple CC, where the CC have, or at least the possibility to have, the same structure as a Rel-8 carrier. CA is illustrated in FIG. 1C.

During initial access an LTE Rel-10 terminal behaves similar to an LTE Rel-8 terminal. Upon successful connection to the network a terminal may—depending on its own capabilities and the network—be configured with additional CCs in the UL and DL. Configuration is based on Radio Resource Control (RRC). Due to the heavy signalling and rather slow speed of RRC signalling it is envisioned that a terminal may be configured with multiple CCs even though not all of them are currently used. If a terminal is activated on multiple CCs this would imply it has to monitor all DL CCs for PDCCH and PDSCH. This implies a wider receiver bandwidth, higher sampling rates, etc. resulting in high power consumption.

In order to preserve the orthogonality in UL the UL transmissions from multiple UEs need to be time aligned at the eNodeB. Since UEs may be located at different distances from the eNodeB, see FIG. 2, the UEs would in such case need to initiate their UL transmissions at different points in time. A UE far from the eNodeB needs to start transmission earlier than a UE close to the eNodeB. This may for example be handled by Timing Advance (TA) of the UL transmissions, i.e. that a UE starts its UL transmission before a nominal time given by the timing of the DL signal received by the UE. This concept is illustrated in FIG. 3, in which timing advance of UL transmissions, depending on distance to eNodeB is illustrated.

The UL timing advance is maintained by the eNodeB through timing alignment commands to the UE based on measurements on UL transmissions from that UE.

Through timing alignment commands, the UE is ordered to start its UL transmissions earlier or later. This applies to all UL transmissions except for random access preamble transmissions on Physical Random Access Channel (PRACH), i.e. comprising transmissions on Physical Uplink Shared Channel (PUSCH), Physical Uplink Control Channel (PUCCH), and Sounding Reference Signal (SRS).

There is a strict relation between DL transmissions and the corresponding UL transmission. Examples of this are the timing between a DL-SCH transmission on Physical Downlink Shared Channel (PDSCH) to the HARQ ACK/NACK feedback transmitted in UL (either on PUCCH or PUSCH). Yet such an example is the timing between an UL grant transmission on Physical Downlink Control Channel (PDCCH) to the UL-SCH transmission on PUSCH.

By increasing the timing advance value for a UE, the UE processing time between the reception of the UL grant in DL and the corresponding UL transmission decreases. For this reason, an upper limit on the maximum timing advance has been defined by 3GPP in order to set a lower limit on the processing time available for a UE. For LTE, this value has been set to roughly 667 µs which corresponds to a cell range of 100 km. Note that the TA value compensates for the round trip delay.

In LTE Rel-10 there is only a single timing advance value per UE and all UL cells are assumed to have the same transmission timing. The reference point for the timing advance is the receive timing of the primary DL cell.

In LTE Rel-11 different serving cells used by the same UE may have different timing advance. Most likely the serving cells sharing the same TA value (for example depending on the deployment) will be configured by the network to belong to a so called TA group. If at least one serving cell of the TA group is time aligned, all serving cells belonging to the same group may use this TA value. To obtain time alignment for an SCell belonging to a different TA group than the PCell, the current 3GPP assumption is that network initiated random access may be used to obtain initial TA for this SCell (and for the TA group the SCell belongs to).

In LTE, as in any communication system, a mobile node may need to contact the network (via the eNodeB) without having a dedicated resource in the Uplink (from UE to base station). To handle this, a random access procedure is available where a UE that does not have a dedicated UL resource may transmit a signal to the base station. The first message of this procedure is typically transmitted on a special resource reserved for random access, a physical random access channel (PRACH). This channel can for instance be limited in time and/or frequency (as in LTE). FIG. 4 is a principal illustration of random-access-preamble transmission. The resources available for PRACH transmission is provided to the terminals as part of the broadcasted system information (or as part of dedicated RRC signalling in case of e.g. handover).

Signalling over the air interface for the contention-based random access procedure used in LTE is illustrated in FIG. 5. The UE starts the random access procedure by randomly selecting one of the preambles available for contention-based random access. The UE then transmits the selected random access preamble on the physical random access channel (PRACH) to eNodeB in the Radio Access Network (RAN). The RAN acknowledges any preamble it detects by transmitting a random access response (MSG2) The MSG2 is transmitted in the DL to the UE.

When receiving the response the UE uses the grant comprised in MSG2 to transmit a message (MSG3) that in part is used to trigger the establishment of radio resource control and in part to uniquely identify the UE on the common channels of the cell. MSG4 which is the contention resolution message is transmitted from the network to the UE.

The procedure ends with RAN solving any preamble contention that may have occurred for the case that multiple UE transmitted the same preamble at the same time.

The UE may also perform non-contention based random access. A non-contention based random access or contention free random access can e.g. be initiated by the eNB to get the UE to achieve synchronisation in UL. The eNB initiates a non-contention based random access either by sending a PDCCH order or indicating it in an RRC message. The later of the two is used in case of HandOver (HO).

Similar to the contention based random access the MSG2 is transmitted in the DL to the UE. The UE considers the contention resolution successfully completed after it has received MSG2 successfully.

For the contention free random access as well as for the contention based random access, the MSG2 contains a timing alignment value. This enables the eNB to set the initial/updated timing of subsequent UL transmissions.

In LTE the Rel-10 random access procedure is limited to the primary cell only. This implies that the UE may only send a preamble on the primary cell. Further MSG2 and MSG3 are only received and transmitted on the primary cell. MSG4 may however in Rel-10 be received on any DL cell.

In LTE Rel-11, the current assumption (RAN2#75, August 2011) is that the random access procedure will be supported also on secondary cells, at least for the UEs supporting Rel-11 carrier aggregation. So far only network initiated random access on SCells is assumed.

To enable frequency-domain processing of RA reception LTE uses RA preambles with a cyclic prefix. The cyclic prefix should cover maximum Round Trip Time, RTT, in the cell plus maximum expected delay spread. To be able to cope with a wide variety of deployment scenarios LTE defines 5 different preamble formats, which are illustrated in FIG. 6.

RA preamble format 4 only has a cyclic prefix length of approximately 15 µs. Assuming a maximum delay spread of 5 µs the maximum supported RTT becomes approximately 10 µs.

In LTE Rel-11 it has been agreed that UEs should support to simultaneously aggregate cells from network nodes at different physical locations, even for UL. This requires the UEs to have multiple TA values due to different propagation delays in the UL. A TA value needs a timing reference. A UE starts UL subframe transmission to cell i at TAi seconds earlier than the timing reference for cell i.

Which timing reference should be used for SCells in Rel-11 is currently discussed in 3GPP RAN2 and alternatives brought up are the PCell or an SCell. In Rel-10 the PCell downlink is used as timing reference for all cells.

Technical advantages for using the PCell downlink as timing reference are, for example, that Radio Link Monitoring (RLM) is only done for the PCell which makes the timing reference reliable. Also, if an SCell is used as timing reference, complexity is needed to handle what should happen when this SCell is deactivated; this would be avoided if the PCell is used as timing reference since the PCell cannot be deactivated. Aside from these technical aspects it is strived for to align behaviour between LTE releases.

However, it has been identified that if the PCell downlink is used as timing reference for an SCell configured with preamble format 4 the RA preamble could reach the SCell receiver outside of the preamble reception window and the RA procedure then fails as the SCell receiver does not detect/receive the preamble signalling from the UE.

SUMMARY

It is therefore an object to obviate at least some of the above mentioned disadvantages and to improve the performance in a wireless communication system.

According to a first aspect, the object is achieved by a method in a mobile node, such as a user equipment or a mobile relay station of determining when to transmit a signal. The mobile node operates in a wireless communication network comprising a first cell and a second cell where the mobile node is synchronized to the first cell. The method comprises determining a timing reference based on a reception of a downlink transmission in the first cell and transmitting the signal, to be received in the second cell, at a point in time based on the timing reference and a timing advance value of the first cell.

According to a second aspect, the object is achieved by a mobile node, such as a user equipment, or a mobile relay station, for determining when to transmit a signal. The mobile node is configured to operate in a wireless communication network comprising a first cell and a second cell, where the mobile node is synchronized to the first cell, the mobile node comprises a processing circuitry configured to determine a timing reference based on a reception of a downlink transmission in the first cell. The mobile node also comprises a transmitter configured to transmit the signal, to be received in the second cell, at a point in time based on the timing reference and a timing advance value of the first cell.

Thanks to embodiments of the present methods and mobile nodes, e.g. user equipment or relay station, any DL synchronized cell within a wireless communication network, such as e.g. the PCell, may be used as a timing reference for any uplink transmission made from a user equipment or mobile relay station in any other cell, such as e.g. SCells even transmitted and/or received from Remote Radio Heads, RRHs, using RA preamble format 4. This is beneficial in comparison with using the SCell as timing reference, as using an SCell as timing reference would possibly require Radio Link Monitoring (RLM) on the SCell, which would add extra complexity. The UE or relay station is further enabled to use the same timing reference for all its configured cells if the PCell is used as the timing reference, thereby avoiding complexity for maintaining which timing reference should be used for each respective cell. Since the PCell cannot be deconfigured there is no risk that the UE or relay station needs to reconfigure which cell should be timing reference, which would be the case if an SCell is the timing reference.

Thus an improved performance within the wireless communication system is achieved.

Other objects, advantages and novel features will become apparent from the following detailed description of the present method and user equipment.

BRIEF DESCRIPTION OF THE DRAWINGS

The methods and mobile node/user equipment are described in more detail with reference to attached drawings illustrating examples of embodiments in which.

DETAILED DESCRIPTION

Embodiments herein are defined as a method in a mobile node and a mobile node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
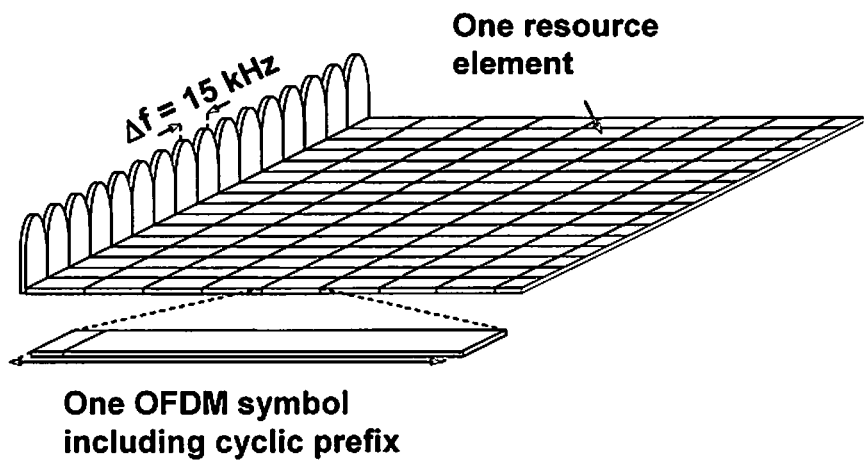
FIG. 1A is a schematic block diagram illustrating an embodiment of a feature according to prior art.
Figure 1B:
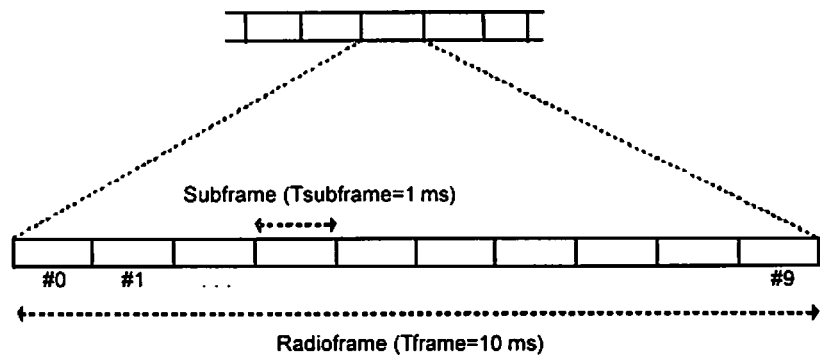
FIG. 1B is a schematic block diagram illustrating an embodiment of a feature according to prior art.
Figure 1C:
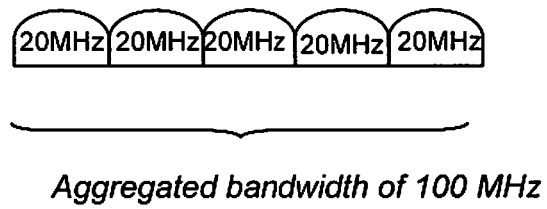
FIG. 1C is a schematic block diagram illustrating an embodiment of a feature according to prior art.
Figure 2:
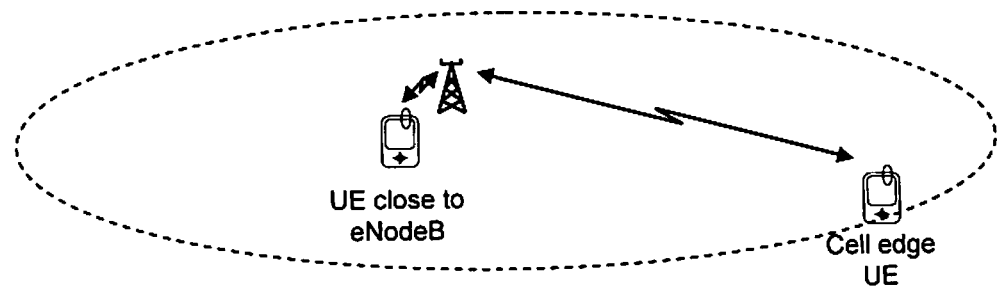
FIG. 2 is a schematic block diagram illustrating an example of a wireless communication system according to prior art.
Figure 3:
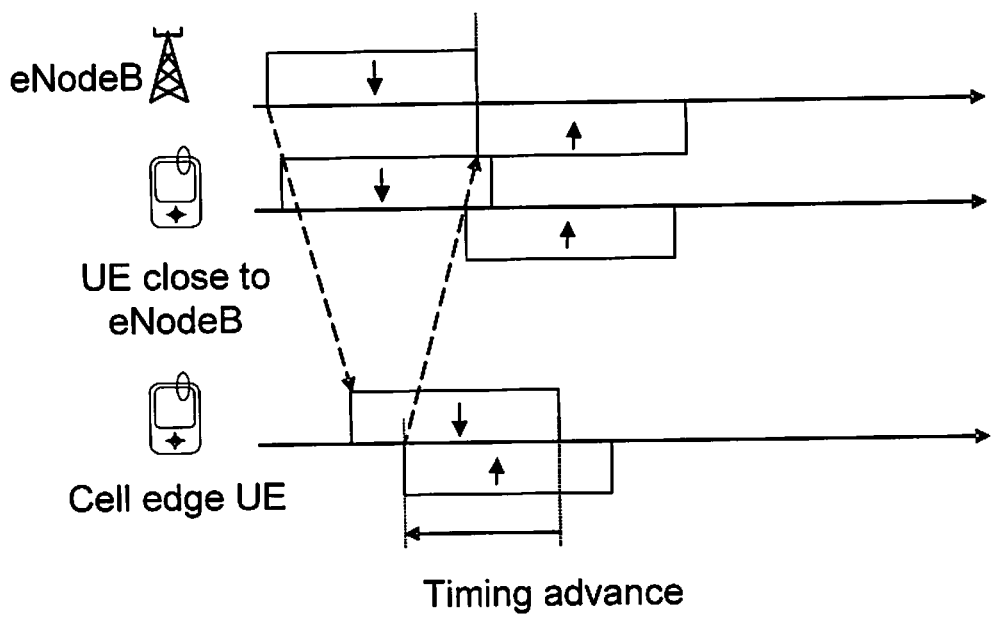
FIG. 3 is a schematic block diagram illustrating an example of signalling in a wireless communication system according to prior art.
Figure 4:
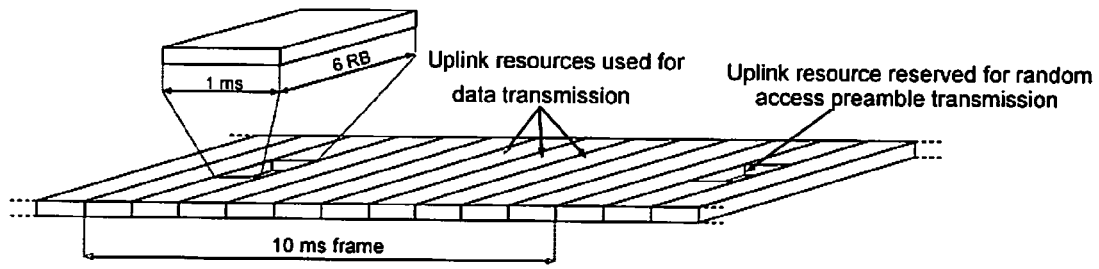
FIG. 4 is a schematic block diagram illustrating an embodiment of a feature according to prior art.
Figure 5:
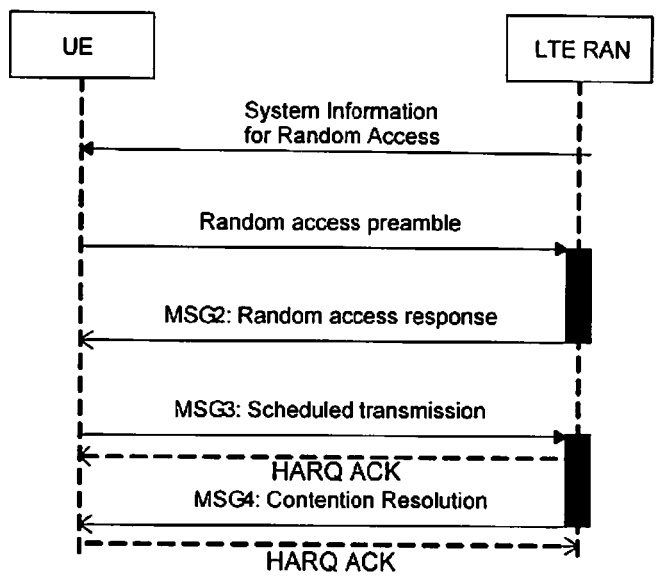
FIG. 5 is a combined block diagram and flow chart illustrating examples of an embodiment of a feature according to prior art.
Figure 6:
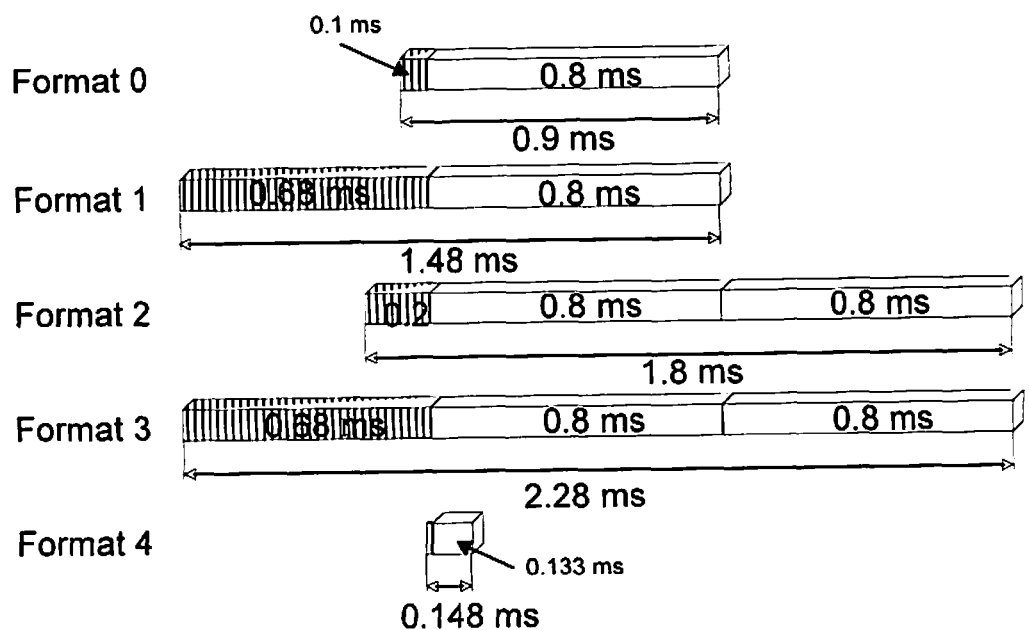
FIG. 6 is a schematic block diagram illustrating an embodiment of a feature according to prior art.
Figure 7:
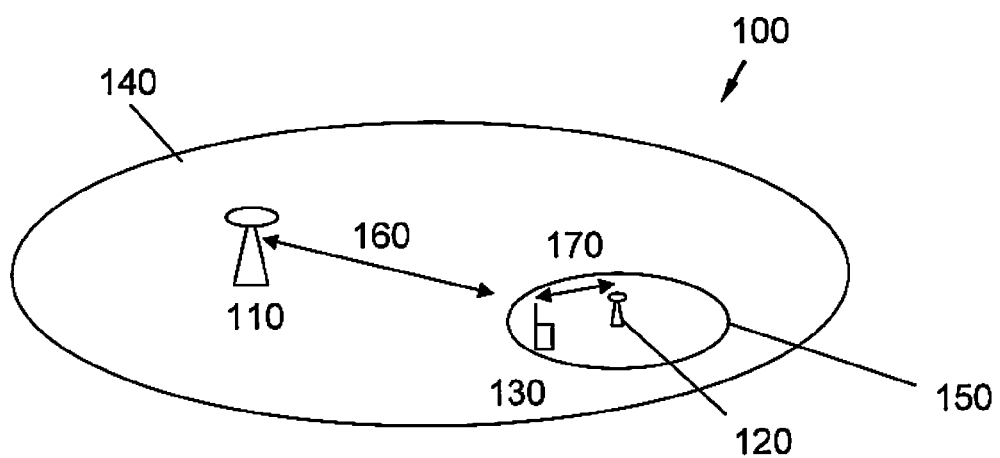
FIG. 7 is a schematic block diagram illustrating an embodiment of a wireless communication system wherein embodiments of the present methods may be applied.

FIG. 7 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (VVCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 7 is to provide a simplified, general overview of the methods, network nodes and user equipment herein described, and the functionalities involved. The methods and user equipment will subsequently, as a non-limiting example, be described in a 3GPP/LTE environment, but the embodiments of the disclosed methods and arrangements may operate in a wireless communication system 100 based on another access technology.

The wireless communication system 100 comprises at least one first network node 110, at least one second network node 120 and at least one mobile node 130, arranged to communicate with each other. The first network node 110, may enable a PCell for a mobile node 130 when the mobile node 130 is served in a first cell 140. The second network node 120, also may enable a SCell for a mobile node 130 when the mobile node 130 is served in a second cell 150. The first network node 110 and the second network node 120 may cooperate in any or both of uplink and downlink transmissions, in some embodiments.

The first network node 110 may communicate with the mobile node 130 over a first link 160, and the second network node 120 may communicate with the mobile node 130 over a second link 170.

It is to be noted that the illustrated network setting of network nodes 110, 120 and mobile node 130 in FIG. 7 is to be regarded as a non-limiting embodiment only. The wireless communication system 100 may comprise any other number and/or combination of network nodes 110, 120 and/or mobile nodes 130, although only one instance of a mobile node 130 and two instances of network nodes 110, 120, respectively, are illustrated in FIG. 7 for clarity reasons. A plurality of network nodes 110, 120 and/or mobile nodes 130 may further be involved in the present methods according to some embodiments.

Thus whenever "one" or "a/an" network node 110, 120 and/or mobile node 130 is referred to in the present context, a plurality of network nodes 110, 120 and/or mobile nodes 130 may be involved, according to some embodiments.

The first and second network node 110, 120 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device, relay node and/or a repeater, remote radio head or any other network node configured for communication with the mobile node 130 over a wireless interface, depending e.g. of the radio access technology and terminology used.

In the subsequent part of the disclosure, in order to not unnecessarily complicate the explanation, the methods and arrangements in the scenario depicted in FIG. 7 will be described, wherein the term "first network node" or "first base station" will be used for the first network node 110, while the term "second network node" or "second base station" will be used for the second network node 120, in order to facilitate the comprehension of the present methods. In addition the notation of "PCell" and "SCell" refers to the cells or component carrier that serve the mobile node 130 from the first network node 110 and second network node 120 respectively. Sometimes the term "first cell" is used for the "PCell" and the term "second cell" is used for the "SCell". Lastly, as stated in the background section, when the term cell is used in the following it refers to the carrier serving the user equipment, if not explicitly stated otherwise or when it in any other way is clear from context that it is not.

The mobile node 130 may be represented by e.g. a user equipment, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the first or second network node 110, 120. In the subsequent specification the mobile node 130 will sometimes be referred to as a user equipment, or UE and sometimes as a relay node, or just a mobile node.

In LTE Rel-11 new carrier aggregation scenarios are supported, some of which require multiple TA values due to aggregation of UL cells from different physical locations. A TA value tells a UE when it should start uplink subframe transmission relative to a reference. This reference, called timing reference, has in earlier releases been the time of DL reception on the UEs PCell. A UE starts transmitting the UL subframe on cell i at time TAi seconds before the timing reference for cell i. To be clear, the downlink transmission timing from a cell i is repetitive. So when it is stated that the UL transmission is before the timing reference it is actually that a timing reference is established for a DL reception and that timing reference is used for any upcoming UL transmission following the DL reception.

Some possible alternatives for selecting as timing reference may be:
the time of reception of the DL subframe start on the PCell,
the time of transmission of UL subframe start on the PCell,
the time of reception of the DL subframe start on an SCell, or
the time of transmission of UL subframe start on an SCell.

Technical advantages for using the PCell downlink as timing reference are, for example, that Radio Link Monitoring (RLM) is only done for the PCell which makes the reference reliable. Since the PCell cannot be deactivated as compared to SCells means that it is not necessary to introduce complexity for handing a timing reference change at SCell deactivation. Aside from these technical aspects it is strived for to align different behaviour between LTE releases.

The maximum allowed reception time difference between a UEs aggregated DL cells is approximately 30 μs. Preamble format 4 has a reception window of 10 μs, i.e. the SCell receiver is only able to correctly receive UL transmissions received 0 μs to 10 μs after the DL transmission is sent. If the SCell timing reference is the reception of the PCell DL subframe start and the PCell and SCell are not transmitted from the same physical location the SCell receiver might receive the RA preamble outside its receiver window. With a reception window of 10 μs it means that the cell receiver can only correctly receive preambles 0 μs to 10 μs after the cell transmitter has transmitted the start of the DL subframe. This limits the maximum round trip time to 10 μs which translates to a maximum propagation delay of 5 μs.

Figure 8:
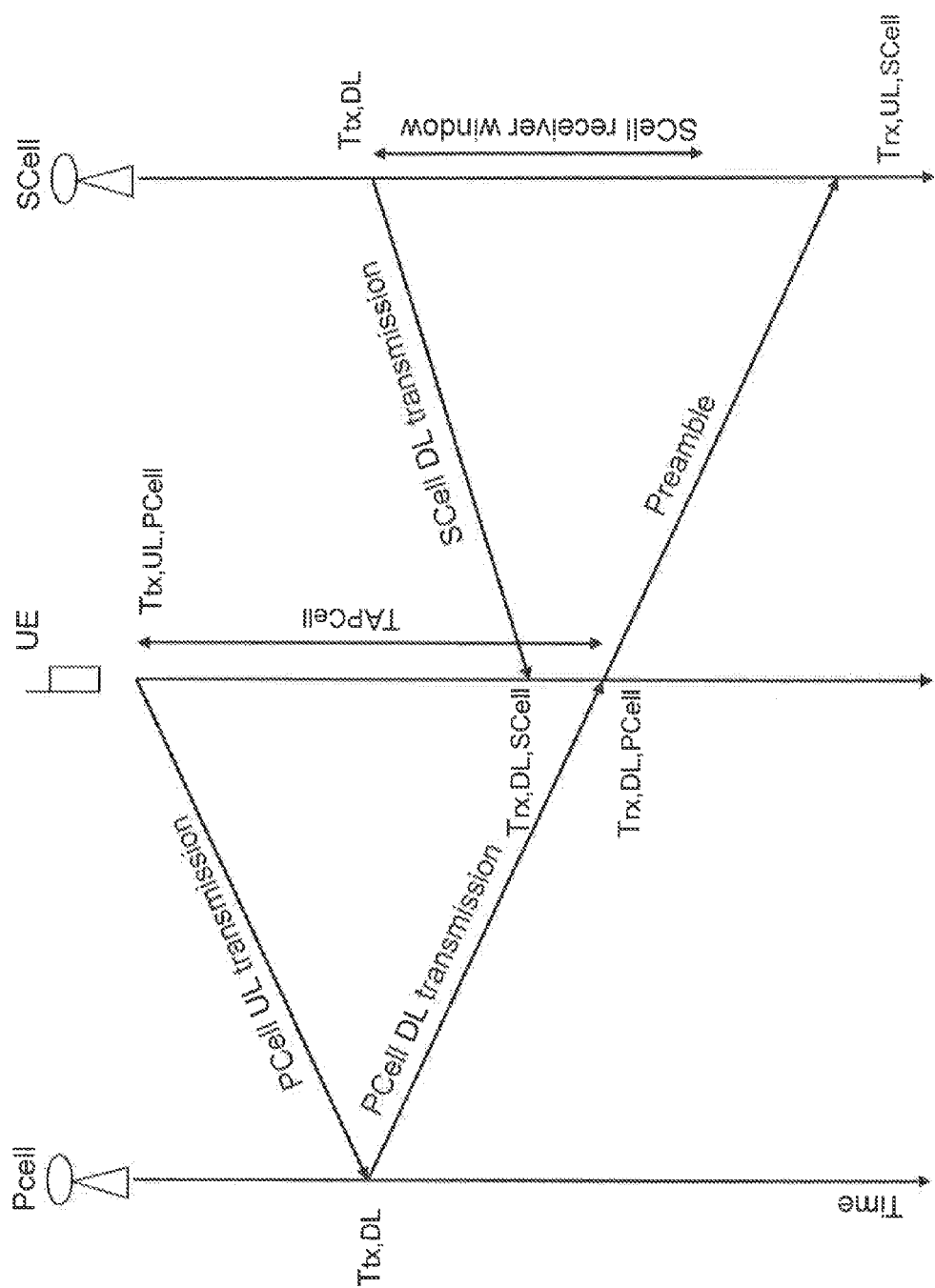
FIG. 8 is a combined block diagram and flow chart illustrating examples of an embodiment.

In FIG. 8 an example is shown in which the RA preamble could, when preamble format 4 is used in SCell, reach the SCell receiver outside of its reception window. The UE is configured with its PCell on frequency f1 and an SCell on frequency f2. The propagation delay on the PCell is δPCell and the propagation delay on the SCell is δSCell. If time Tbx,DL is the time when the network nodes transmit the start of the DL subframe, the UE will receive PCell at time Tbx,DL+δPCell. This would be the time of preamble transmission on the SCell if the DL subframe start on the PCell is the timing reference for the SCell. The preamble would reach the SCell at time Tbx,DL+δPCell+δSCell. δPCell can range from 0 μs to 35 μs and δSCell ranges from 0 μs to 5 μs. The sum of δPCell+δSCell ranges from 0 μs to 40 μs and the preamble might not reach within the SCells receiver reception window.

In FIG. 8 it is shown how the preamble reaches the SCell outside of the receiver window. The diagram shows the signal transmission between UE and its cells according to prior art when the PCell DL is timing reference to the SCell.

Figure 9:
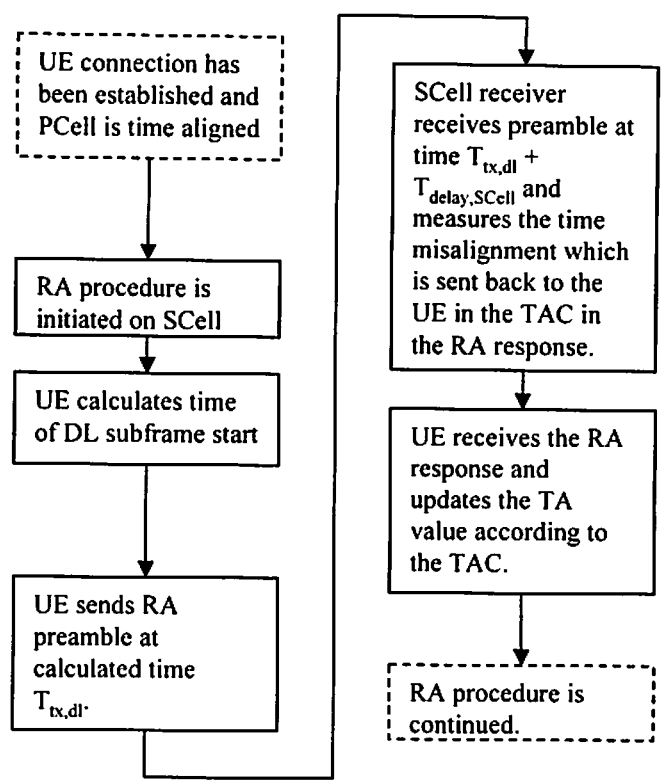
FIG. 9 is a schematic flow chart illustrating examples of an embodiment of the method.

FIG. 9 is a flow diagram showing an overview of actions taken for SCell uplink transmission, e.g. a signal or a random access preamble, including actions made by both the UE and the second network node, i.e. the node that provides the second cell or SCell for the UE. It is assumed that a UE connection has been established and PCell is time aligned, meaning that there is a valid TA value for the PCell. The RA procedure is initiated on SCell e.g. the UE wants to start communicating using the second cell. The UE then calculates time of DL subframe start, Ttx,dl, from the first network node 110 i.e. the node providing the first cell or PCell for the UE. The UE sends a signal or a RA preamble at the calculated time Ttx,dl. The SCell receiver then receives the signal or RA preamble at time Ttx,dl+$T_{delay,SCell}$ and measures the time misalignment which is sent back to the UE in the timing alignment command, TAC, in the RA response. $T_{delay,SCell}$ is the propagation time of the signal from the UE on the second cell. The UE then receives the RA response and updates the TA value for the second cell according to the TAC.

Figure 11:
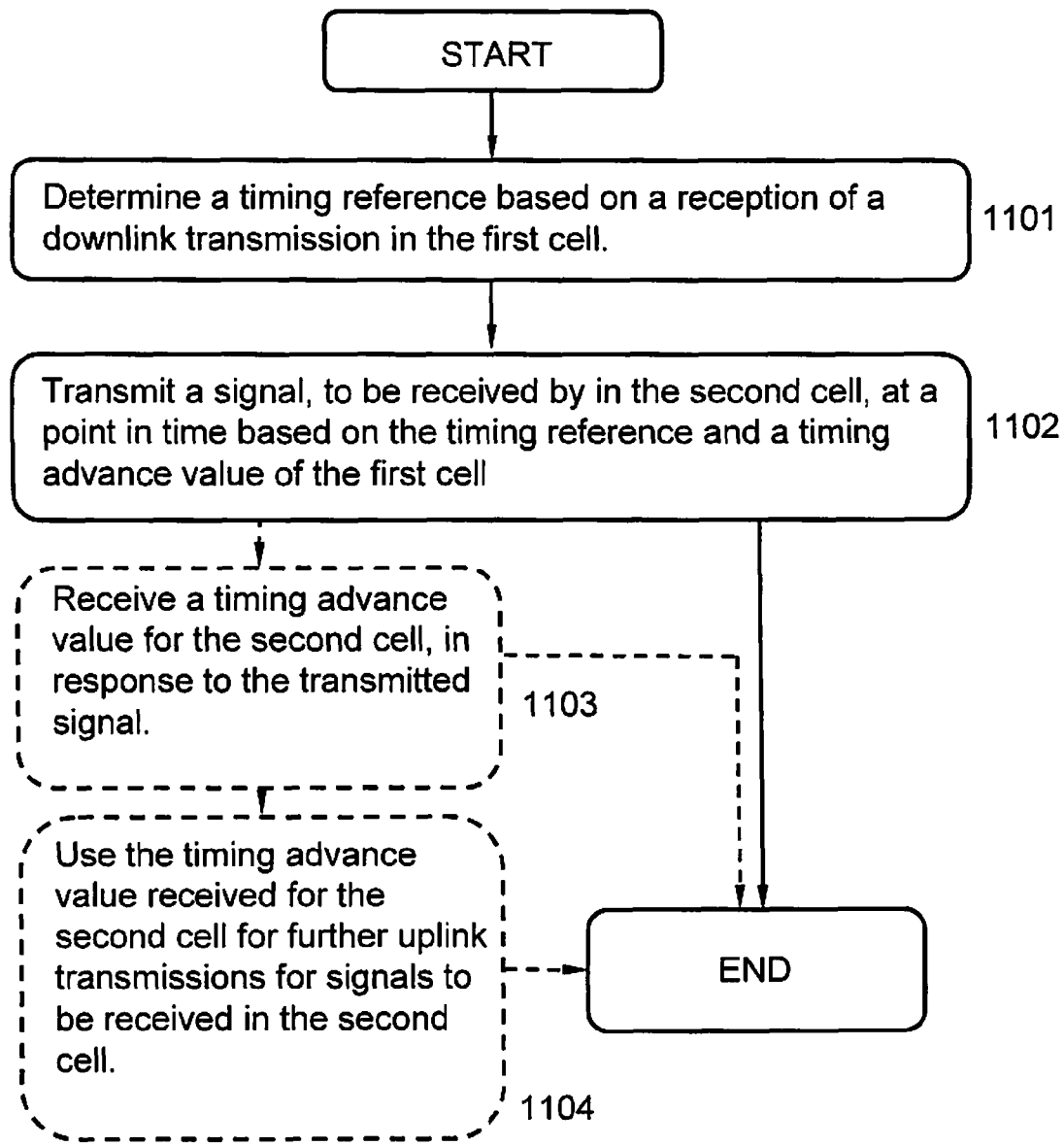
FIG. 11 is a schematic flow chart illustrating examples of an embodiment of the method in a mobile node.

FIG. 11 is a flow chart illustrating embodiments of a method in a mobile node 130, which is configured to communicate with a first network node 110 and a second network node 120.

The method aims at determining a point in time to transmit a signal, such as e.g. a signal or more specifically a random access preamble, in order for the signal to be received by the second network node 120 when the mobile node 130 is not UL synchronized in the second cell. The point in time may be determined using the time of downlink transmission on the first cell as timing reference, according to some embodiments. Other timing references are also possible in some embodiments.

To appropriately determine the point in time for uplink transmission, the method may comprise a number of actions 1101-1104.

It is however to be noted that some of the described actions, e.g. action 1101-1104 may be performed in a somewhat different chronological order than the enumeration indicates. Also, it is to be noted that some of the actions such as e.g. 1103 and/or 1104 may be performed within some alternative embodiments. Further, any, some or all actions, such as e.g. 1101 and/or 1102 may be performed simultaneously or in a rearranged chronological order. The method may comprise the following actions:

Action 1101

Determining, e.g. by calculating, a point in time related to downlink transmission of subframes from the first network node 110. In order to calculate or determine a point in time it is necessary to have a timing reference. The timing reference may be determined in a number of ways as will be explained below. The timing reference will however be based on the reception of a downlink signal in the first cell. This is performed in some embodiments by determining a timing reference based on a reception of a downlink transmission in the first cell wherein the mobile node 130 is synchronized to the first cell.

According to a first embodiment, the mobile node 130 uses reception of DL subframe start in the first cell as timing reference. The mobile node 130 may therefore use the time of reception of a sub-frame in the first cell as timing reference.

According to a second embodiment, the timing reference is the time of reception of a sub-frame in the first cell minus the timing advance value for the first cell. This timing reference will coincide with the UE's UL transmission on the first cell. The mobile node 130 may therefore use an UL transmission from the mobile node 130 to the first cell as timing reference.

According to a third embodiment, the timing reference is the time of reception of a sub-frame in the first cell minus half the timing advance value for the first cell. This timing reference will coincide with the DL transmission on the first cell. The mobile node 130 may therefore use the determined DL transmission time of the first cell as timing reference.

Before performing the action 1101, the mobile node 130 may acquire/receive the timing advance value related to the first cell from first network node.

In all above embodiment the start of a DL subframe may be used as a timing reference. Equally, the end of a DL subframe or another specified location within a subframe may be used as timing reference. Accordingly the determination of the timing reference may be based on the start of the reception, the end or on a specified location within a sub-frame, of a sub-frame received from the first cell.

Action 1102

Transmit 1102 a signal, to be received in the second cell by the second network node 120, at a point in time based on the determined timing reference and a timing advance value of the first cell. According to some embodiments, the point in time related to downlink transmission of subframes from the first network node 110 may be calculated by using the timing advance value of the first network node 110.

According to the first embodiment where the timing reference is the time of reception of a sub-frame from the first cell the point in time to transmit the signal is based on the timing reference minus half the timing advance value of the first cell.

According to the second embodiment where the timing reference is the time of reception of a sub-frame from the first cell minus the timing advance value for the first cell, the point in time to transmit the signal is based on the timing reference plus half the timing advance value of the first cell.

According to the third embodiment where the timing reference is the time of reception of a sub-frame from the first cell minus half the timing advance value for the first cell, the point in time to transmit the signal is based on the timing reference.

In all embodiments described above the point in time may be used as an initial or preliminary TA value for the second network node 120.

The mobile node 130 may thus transmit the signal, or random access preamble at the calculated point in time. The signal may then reach the receiver of the second network node 120 at a later point in time due to the time it takes for the uplink signal to propagate to the receiver of the second network node 120. Such uplink propagation time may be less than 5 μs if preamble format 4 is used, while the receiver of the second network node 120 may receive the signal within the SCell RACH reception window.

Figure 10:
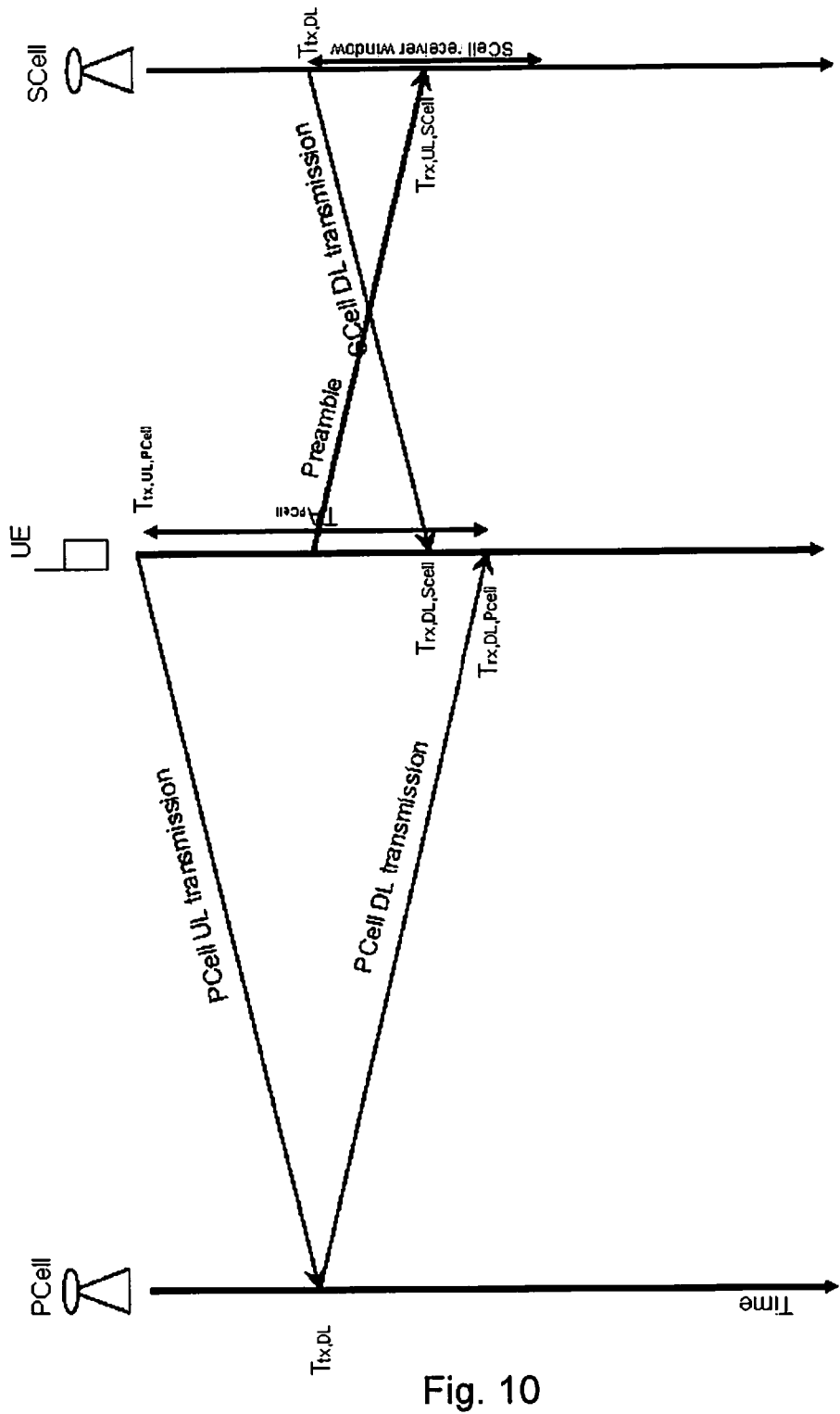
FIG. 10 is a combined block diagram and flow chart illustrating examples of an embodiment of the present method.

The result of action 1101 and 1102 can be found in FIG. 10 which shows a diagram of the signal transmission between a UE and its cells when the PCell DL transmission is timing reference to the SCell.

In addition, the point in time for transmitting the signal from the mobile node 130 may further be based on an offset where the offset value may be used to compensate for asymmetry in propagation time between uplink and downlink. This offset value may be received by the mobile node 130 from the wireless communication network.

Action 1103

This action may be comprised within some alternative embodiments, but not necessarily within all embodiments of the method.

Receive 1103 a timing advance value for the second cell, as a response to the transmitted 1102 signal.

When the second network node 120 receives the signal from the mobile node 130, it may measure the time alignment and send back a timing advance command to the mobile node 130, based on the signal received from the mobile node 130.

Action 1104

This action may be comprised within some alternative embodiments, but not necessarily within all embodiments of the method.

The timing advance value for the second cell for further uplink transmissions of signals may be used for transmission in the second cell. Thereby may, according to some embodiments, the timing advance value for the second cell be further fine-tuned.

The three embodiments as described in relation to action 1101 and 1102 will now be described in more detail as to give a more comprehensive picture on when the mobile node 130 should transmit in the uplink to the second cell.

In a first embodiment the UE calculates the time of the transmission of DL subframe start, referred to as Ttx,DL, by using a TA value TACellX of an already synchronized cell X. Ttx,DL is equal to Trx,DL,CellX−TACellX/2. The UE uses reception of DL subframe start on cell X as timing reference and an initial TA value for the SCell, TASCell, equal to TACellX/2. The UE transmits the signal or RA preamble to the SCell receiver at the time Ttx,DL, it will reach the SCell receiver at Ttx,DL+δSCell. δSCell is maximum 5 μs if preamble format 4 is used hence the latest time the SCell will receive the RA preamble is Ttx,DL+δSCell which is within the SCell RACH reception window. In case UL and DL don't have the same propagation times—e.g. due to one-way repeaters—the DL propagation time is not exactly TACellX/2. In this case the initial TA value can be set according to TASCell=TACellX/2+os. The quantity os is an offset (positive and negative values) that can either be signaled from the network to the UE, or the UE could autonomously decide its offset value. This offset corrects for asymmetry in propagation and ensures correct preamble transmission timing.

In a second embodiment the UE calculates the time of the transmission of DL subframe start, referred to as Ttx,DL, by using a TA value TACellX of an already synchronized cell X. Ttx,DL is equal to Ttx,UL,CellX+TACellX/2. The UE uses transmission of UL subframe start on cell X as timing reference and an initial TA value for the SCell, TASCell, equal to −TACellX/2., which implies a signal or RA preamble transmission timing on the SCell at Ttx,DL, it will reach the SCell receiver at Ttx,DL+δSCell. δSCell is maximum 5 μs if preamble format 4 is used hence the latest time the SCell will receive the RA preamble is Ttx,DL+δSCell which is within the SCell reception window. In case UL and DL don't have the same propagation times—e.g. due to one-way repeaters—the UL propagation time is not exactly TACellX/2. In this case the initial TA can be set according to TASCell=−TACellX/2+os. The quantity os is an offset (positive or negative values) that can either be signalled from the network to the UE, or the UE could autonomously decide its offset value. This offset corrects for asymmetry in propagation and ensures a correct preamble transmission timing.

In a third embodiment the UE calculates the time of the transmission of DL subframe start, referred to as Ttx,DL, by using a TA value TACellX of an already synchronized cell X. Ttx,DL is equal to Trx,DL,CellX−TACellX/2. The UE uses transmission of DL subframe start on cell X as timing reference and an initial TA value for the SCell, TASCell, equal to zero. The UE transmits the signal or RA preamble to the SCell at the time Ttx,DL, it will reach the SCell Ttx,DL+δSCell. δSCell is maximum 5 μs if preamble format 4 is used hence the latest time the SCell will receive the RA preamble is Ttx,DL+δSCell which is within the SCell reception window. In case UL and DL don't have the same propagation times—e.g. due to one-way repeaters—the DL propagation time is not exactly TACellX/2. In this case the UE calculates Ttx,DL=Trx,DL,CellX−TACellX/2+os. The quantity os is an offset (positive or negative values) that can either be signalled from the network to the UE, or the UE could autonomously decide its offset value. This offset corrects for asymmetry in propagation and ensures a correct preamble transmission timing.

In all above embodiment the start of a DL subframe has been used as a timing reference. Equally, the end of a DL subframe or another specified location within a subframe may be used as timing reference.

In a fourth embodiment a UE chooses different methods how to calculate the RA preamble timing depending on the RA preamble format. For example, for RA preamble format 0 to 3 a UE could use reception of DL subframe start on cell X as timing reference and transmit RA preamble with fixed offset relative to this timing reference, e.g. at Trx,DL,CellX (the fixed offset is zero in this example). For preamble format 4 the UE could use any of embodiment 1 to 3 e.g. embodiment 1.

Figure 12:
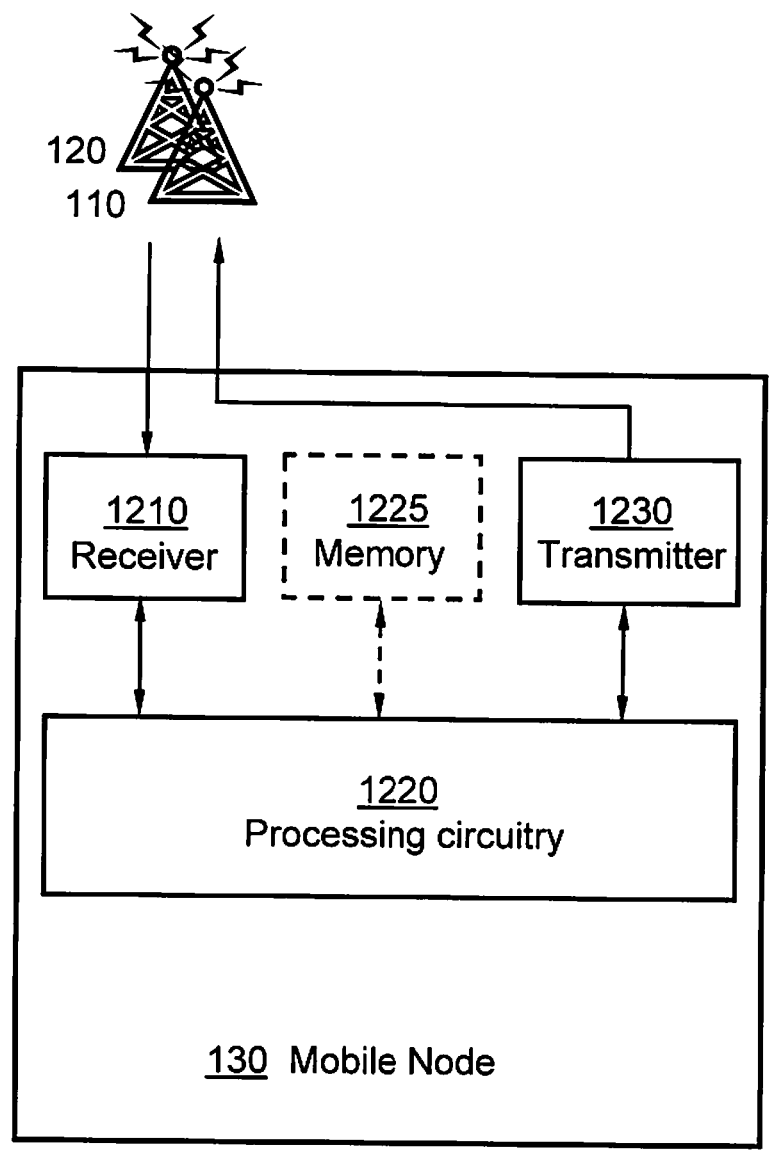
FIG. 12 is a schematic block diagram illustrating an example of an embodiment of a mobile node.

FIG. 12 is depicting a mobile node 130 according to some embodiments. The mobile node 130 is configured to perform any, some or all of the actions 1101-1104 for determine a reference timing and transmitting a signal.

For enhanced clarity, any internal electronics or other components of the mobile node 130, not completely indispensable for understanding the present method has been omitted from FIG. 12. The mobile node 130 may comprise a user equipment according to some embodiments, or a relay node according to alternative embodiments.

In order to perform the actions 1101-1104 correctly, the mobile node 130 comprises a processing circuitry 1220 where the processing circuitry 1220 is configured to determine a timing reference based on a reception of a downlink transmission from the first cell.

In some embodiments the processing circuitry 1220 is configured to determine the timing reference as the time of reception of a sub-frame from the first cell and to determine the point in time based on the timing reference minus half the timing advance value of the first cell.

In some embodiments the processing circuitry 1220 is configured to determine the timing reference as the time of reception of a sub-frame from the first cell minus the timing advance value for the first cell and to determine the point in time based on the timing reference plus half the timing advance value of the first cell.

In some embodiments the processing circuitry 1220 is configured to determine the timing reference as the time of reception of a sub-frame from the first cell minus half the timing advance value for the first cell and to determine the point in time is based on the timing reference.

In addition, according to some embodiments, the mobile node 130 may comprise a receiver 1210 configured to receive an offset value from the wireless communication network.

Further, the mobile node 130 comprises a transmitter 1230, configured to transmit the signal, to be received by the second cell, at a point in time based on the timing reference and a timing advance value of the first cell.

In addition, according to some embodiments, the mobile node 130 may comprise a receiver 1210, configured to receive a timing advance value from the second network node 120, as a response to the transmitted signal.

The receiver 710 may further be configured to receive wireless signals from the first network node 110, and/or from the second network node 120 for example on the first cell and/or the second cell.

The processing circuitry 1220 comprised in the mobile node 130 may according to some embodiments be further configured to use the timing advance value received from the second network node 120 for further uplink transmissions for signals to be received by the second network node 120. Thereby, according to some embodiments, the timing advance value for the second network node 120 may be further fine-tuned.

The processing circuitry 1220 may comprise e.g. one or more instances of a Central Processing Unit (CPU), a processing unit, a processor, a microprocessor, or other processing logic that may interpret and execute instructions. The processing circuitry 1220 may further perform data processing functions for inputting, outputting, and processing of data comprising data buffering and device control functions, such as call processing control, user interface control, or the like.

According to some embodiments, the mobile node 130 may comprise at least one memory 1225. The memory 1225 may comprise a physical device utilized to store data or programs i.e. sequences of instructions, on a temporary or permanent basis. According to some embodiments, the memory 1225 may comprise integrated circuits comprising silicon-based transistors. Further, the memory 1225 may be volatile or non-volatile. The mobile node 130 may further according to some embodiments comprise at least one volatile memory 1225 and also at least one non-volatile memory 1225.

Further, it is to be noted that some of the described units 1210-1230 comprised within the mobile node 130 in the wireless communication system 100 are to be regarded as separate logical entities but not with necessity separate physical entities. To mention just one example, the receiver 1210 and the transmitter 1230 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first network node 110, the second network node 120 and the mobile node/user equipment 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 1101-1104 to be performed in the mobile node 130 may be implemented through one or more processing circuits 1220 in the mobile node 130, together with computer program code for performing the functions of the present actions 1101-1104. Thus a computer program product, comprising instructions for performing the actions 1101-1104 in the mobile node/user equipment 130 may determine a point in time to transmit a signal, such as e.g. a random access signal or a preamble, in order for the signal to be received by the second network node 120 when the timing access of the second network node 120 is not known by the mobile node 130, when the computer program code is loaded into the one or more processing circuitry 1220.

The computer program product mentioned above may be provided for instance in the form of a data carrier carrying computer program code for performing at least some of the actions 1101-1104 according to some embodiments when being loaded into the processing circuitry 1220. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the mobile node/user equipment 130 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodi-

ABBREVIATIONS

CC Component Carrier
CCE Control Channel Elements
EARCFN E-UTRA Channel Number
PDCCH Physical Downlink Control Channel
RACH Random Access Control Channel
RA Random Access
RNTI Radio Network Temporary Identifier(s)
RLM Radio Link Monitoring
RRH Remote Radio Head
TA Timing Advance
TAC Timing Advance Command
TAT Timing Advance Timer
AL Aggregation Layer
PCC Primary component carrier
PCell Primary cell
SCC Secondary component carrier
SCell Secondary cell

The invention claimed is:

1. A method in a mobile node, of determining when to transmit a signal, wherein the mobile node operates in a wireless communication system comprising a first cell and a second cell, where the mobile node is synchronized to the first cell, the method comprising:
   determining a timing reference based on a reception of a downlink transmission in the first cell;
   transmitting the signal, to be received in the second cell, at a point in time based on the timing reference and a timing advance value of the first cell;
   receiving a timing advance value for the second cell in response to the transmitted signal;
   using the received timing advance value for the second cell for further transmissions of signals to be received in the second cell; and
   determining a time of start of transmission of a downlink sub-frame in the second cell, wherein the determining the time of start of transmission of the downlink sub-frame in the second cell is based on the timing reference and the timing advance value for the second cell,
   wherein the timing advance value for the second cell is half the timing advance value of the first cell plus an offset value, and
   wherein the offset value corrects asymmetry in propagation times between uplink and downlink transmissions.

2. The method of claim 1, wherein the timing reference is the time of reception of a sub-frame in the first cell and where the point in time is based on the timing reference minus half the timing advance value of the first cell.

3. The method of claim 1, wherein the timing reference is the time of reception of a sub-frame in the first cell minus the timing advance value for the first cell and where the point in time is based on the timing reference plus half the timing advance value of the first cell.

4. The method of claim 1, wherein the timing reference is the time of reception of a sub-frame in the first cell minus half the timing advance value for the first cell and where the point in time is based on the timing reference.

5. The method of claim 1, wherein the offset value is received by the mobile node from the wireless communication system.

6. The method of claim 1, wherein the determination of the timing reference is based on the start of the reception of a sub-frame in the first cell.

7. The method of claim 1, wherein the determination of the timing reference is based on the end of the reception of a sub-frame in the first cell.

8. The method of claim 1, wherein the determination of the timing reference is based on a specified location within a sub-frame received in the first cell.

9. The method of claim 1, wherein the signal comprises a random access preamble.

10. The method of claim 9, wherein the random access preamble is of preamble format 4.

11. A mobile node, for determining when to transmit a signal, wherein the mobile node is configured to operate in a wireless communication system comprising a first cell and a second cell, where the mobile node is synchronized to the first cell, the mobile node comprising:
   a processing circuitry configured to determine a timing reference based on a reception of a downlink transmission in the first cell;
   a transmitter configured to transmit the signal, to be received in the second cell, at a point in time based on the timing reference and a timing advance value of the first cell; and
   a receiver configured to receive a timing advance value for the second cell in response to the transmitted signal;
   wherein the processing circuitry is further configured to:
      use the received timing advance value for the second cell for further transmissions of signals to be received in the second cell, and
      determine a time of start of transmission of a downlink sub-frame in the second cell, wherein the determining the time of start of transmission of the downlink sub-frame in the second cell is based on the timing reference and the timing advance value for the second cell,
   wherein the timing advance value for the second cell is half the timing advance value of the first cell plus an offset value, and
   wherein the offset value corrects asymmetry in propagation times between uplink and downlink transmissions.

12. The mobile node of claim 11, wherein the timing reference is the time of reception of a sub-frame in the first cell and where the point in time is based on the timing reference minus half the timing advance value of the first cell.

13. The mobile node of claim 11, wherein the timing reference is the time of reception of a sub-frame in the first cell minus the timing advance value for the first cell and where the point in time is based on the timing reference plus half the timing advance value of the first cell.

14. The mobile node of claim 11, wherein the timing reference is the time of reception of a sub-frame in the first cell minus half the timing advance value for the first cell and where the point in time is based on the timing reference.

15. The mobile node of claim 11, wherein the offset value is received by the mobile node from the wireless communication system.

16. The mobile node of claim 11, wherein the determination of the timing reference is based on the start of the reception of a sub-frame in the first cell.

17. The mobile node of claim 11, wherein the determination of the timing reference is based on the end of the reception of a sub-frame in the first cell.

18. The mobile node of claim 11, wherein the determination of the timing reference is based on a specified location within a sub-frame received in the first cell.

19. The mobile node of claim 11, wherein the signal comprises a random access preamble.

20. The mobile node of claim 19, wherein the random access preamble is of preamble format 4.

* * * * *